United States Patent Office 3,189,559
Patented June 15, 1965

3,189,559
DECHLORIDED PLATINUM ON ETA ALUMINA CATALYST PREPARATION
Louis C. Doelp, Jr., Glen Mills, and George Alexander Mills, Swarthmore, Pa., assignors to Air Products and Chemicals, Inc., Philadelphia, Pa., a corporation of Delaware
No Drawing. Filed Mar. 21, 1962, Ser. No. 181,467
2 Claims. (Cl. 252—442)

This invention relates to the preparation of platinum on alumina catalyst granules containing an amount of halide less than 25% by weight of the platinum and prepared by dehaliding granules impregnated with chloroplatinic acid.

In accordance with the present invention, an aqueous solution containing at least 3 molar ammonium hydroxide is employed to leach chloride from the product from the chloroplatinate impregnation and calcination of eta alumina granules.

The nature of the present invention is further clarified by some examples.

Example I

Beta alumina trihydrate was extruded into pellets and calcined and cooled to provide high purity eta alumina pellets. A spray of chloroplatinic acid was employed to impregnate the eta alumina pellets, which were dried at 30–130° C. for several minutes, and calcined at 450° C. for about one hour, and cooled to provide a catalyst containing about 0.5% platinum and about 0.55% chloride. Catalyst pellets consisting of about 0.5% platinum, about 0.5% chloride, and about 99% high purity eta alumina, prepared as described, have been proved by large tonnage utilization to be satisfactory catalysts for the naphtha reforming requirements of some petroleum refineries and for certain other methods benefiting from this kind of catalyst.

The catalyst pellets were immersed in 9 molar ammonium hydroxide (prepared by diluting the commercially available 28% with an equal weight of water) for one hour at room temperature, and the liquid drained therefrom contained significant chloride. The same kind of leaching with 9 molar ammonium hydroxide was repeated, and the the pellets were leached with water several times until a 20 minute leach at room temperature failed to remove detectable amounts of chloride and/or ammonia. In some preparations there were as few as five leachings with water.

The water leached pellets were dried for 2 hours at 130° C., and then for 2 hours at 480° C., and then cooled. The dehalided catalyst contained less than 0.1% chloride, no detectable amount of fluoride, iodide, or halide other than chloride. The concentration of the platinum remained at 0.5%.

The dehalided pellets were employed in a laboratory unit for hydrogenative reforming of naphtha to evaluate their long term stability, selectivity, and activity, and it was established that these pellets perform as well in such reforming operations as dehalided platinum on alumina catalyst prepared by more complicated and expensive procedures than the procedure of the present invention.

Example II

Granules of eta alumina are prepared by calcination of particles prepared by mixing nitric acid and beta alumina trihydrate. An aqueous solution of chloroplatinic acid is sprayed on the granules to provide a catalyst consisting of 0.5% platinum, about 0.5% chloride, and about 99% eta alumina. The impregnated particles are dried at about 120° C. for several minutes and heated to 450° C., treated with hydrogen at 450° C. for about one hour and cooled to provide a catalyst consisting of about 0.5% platinum, about 0.5% chloride, and about 99% eta alumina. These catalyst particles have excellent activity and stability, the standard naphtha being upgraded to 98 octane at 20 hours and 99 octane at 200 hours, the standard test conditions being 496° C., 35 atmospheres pressure, a ratio of 6 volumes of $H_2$ per volume of hydrocarbon vapor, and a space rate of 3 volumes of liquid hydrocarbon per volume of catalyst.

A sample of this batch of catalyst granules is dehalided by leaching with aqueous ammonium hydroxide, using six treatments with solutions containing 5% $NH_3$ and three treatments with demineralized water. Chloride is absent from the last leaching with $NH_4OH$ and the test for the presence of ammonium ion is negative in the last leaching with water. The leaching solutions are tested and found to contain less platinum than the amount necessary to justify salvage thereof. The dehalided particles are analyzed and found to consist essentially of 99.45% eta alumina, 0.5% platinum and about 0.05% chloride. These dehalided catalyst granules are dried at 50–150° C. for several minutes, and heated at about 400–500° C. for about an hour to provide a highly advantageous catalyst consisting essentially of platinum on eta alumina.

Naphtha is reformed in the presence of said platinum on eta alumina granules at the standard test conditions, 496° C., 35 atmospheres, 6 $H_2$/RH ratio and a space rate of 3 volumes of naphtha per volume of catalyst. In one series of reforming tests, the reformate is 95 octane number. In another series, a reformate of 92 octane number is obtained after 200 hours. The platinum on eta alumina has an attractive combination of activity and stability.

Commercial operation of reformers containing dehalided catalyst consisting essentially of 0.5% platinum on eta aluminum has provided data which has been interpreted as evidence that such dehalided catalysts have more attractive stability at severe reforming conditions than the similar catalyst containing approximately as much chloride as platinum. A theory has been proposed that at the severe reforming conditions the chloride containing catalyst may be excessively "wild" leading to an initial laydown of sufficient coke to bring the catalyst to the more nearly stable level of activity. Regardless of the correctness of the theory, it must be recognized that under appropriate situations refinery managers prefer to operate reformers with dehalided catalyst instead of halide-containing catalyst. Moreover, catalyst particles consisting essentially of about 0.5% platinum on eta alumina are useful as catalysts for the vapor phase synthesis of various organic compounds.

Example III

A series of batches of platinum on eta alumina catalyst granules are prepared, whereby it is established that the highly advantageous results of the present invention are best achieved by keeping within certain limits. Any of a variety of procedures may be employed in preparing the particles of sorptive alumina provided that the calcined sorbtive alumina particles are classified as eta alumina. The particles are impregnated with an aqueous solution of chloroplatinic acid, whereby the particles contain platinum in an amount within the range from 0.1 to about 1% of the calcined eta alumina. The impregnated particles are calcined, whereby the adherence of the platinum to the eta alumina is strengthened. After cooling, the particles are leached with a volume of aqueous solution greater than the volume of the particles, and the leaching is continued for more than thirty minutes. The leaching may be conducted by transferring a series of batches of solution through the granules in a vessel. The ammonia-treated pellets are leached with a volume of water greater than the volume of the particles. The water-leached pellets are dried for at least 30 minutes at a temperature above 120° C. and may then be employed as a catalyst. In the start-up of vapor phase organic reactions, it is standard practice to condition the catalyst by heating for a moderate time, such as 30 minutes, at the reaction temperature prior to subjecting the catalyst to the organic reactants. Such heat treatment can be deemed a part of the organic synthesis instead of being a part of the catalyst manufacture inasmuch as it is not always conducted at the factory of the catalyst manufacturer. The product from the process of catalyst manufacture consists of particles of platinum on eta alumina containing from 0.1 to 1% platinum and containing a quantity of halide less than 25% of the weight of the platinum.

Obviously many modifications and variations of the invention as hereinbefore set forth may be made without departing from the spirit and scope thereof, and therefore only such limitations should be imposed as are indicated in the appended claims.

What is claimed is:

1. A method of preparing catalysts consisting essentially of about 0.1 to about 1% platinum on eta alumina, and containing a quantity of chloride less than 25% of the weight of the platinum which method consists essentially of: preparing particles of sorbtive alumina identifiable by X-ray as substantially pure eta alumina; impregnating an aqueous solution of chloroplatinic acid into the eta alumina particles; calcining the impregnated particles to strengthen the adherence of the platinum to the eta alumina; cooling the calcined particles; leaching a significant portion of the chloride content from the cooled, calcined particles by treatment with a volume of an aqueous solution greater than the volume of the particles for more than 30 minutes, said aqueous solution containing at least 3 molar ammonium hydroxide; leaching the ammonium hydroxide treated particles with a volume of water greater than the volume of the particles; and drying the leached particles for at least 30 minutes at a temperature above 120° C. to provide catalyst particles consisting essentially of about 0.1 to about 1% platinum on eta alumina, and containing a quantity of halide less than 25% of the weight of the platinum.

2. The method of claim 1 in which: the concentration of ammonia in the aqueous ammonium hydroxide is about 9 molar; the ratio of volume of ammonium hydroxide solution to the volume of the particles is about 2 to 1; and the resulting catalyst particles contain less than 0.1% chloride and more than 0.4% platinum.

References Cited by the Examiner

UNITED STATES PATENTS

| | | | |
|---|---|---|---|
| 2,479,110 | 8/49 | Haensel | 252—441 X |
| 3,032,512 | 5/62 | Michael et al. | 252—441 |
| 3,042,627 | 7/62 | Keith et al. | 252—441 |

FOREIGN PATENTS 787,275  12/57  Great Britain.

MAURICE A. BRINDISI, *Primary Examiner.*